United States Patent
Waku et al.

[11] Patent Number: 5,569,547
[45] Date of Patent: Oct. 29, 1996

[54] CERAMIC COMPOSITE MATERIAL

[75] Inventors: Yoshiharu Waku; Hideki Ohtsubo; Yasuhiko Kohtoku, all of Ube, Japan

[73] Assignee: Ube Industries, Ltd., Yamaguchi, Japan

[21] Appl. No.: 317,916

[22] Filed: Oct. 4, 1994

[30]   Foreign Application Priority Data

Oct. 8, 1993   [JP]   Japan ................................. 5-284099
  Jul. 12, 1994  [JP]   Japan ................................. 6-190861

[51] Int. Cl.$^6$ ............................ B32B 18/00; C04B 35/50
[52] U.S. Cl. ..................... 428/688; 428/700; 428/701; 428/702; 501/127; 501/152; 117/945; 117/947; 117/950
[58] Field of Search ..................... 117/945, 947, 117/950; 501/126, 127, 153, 152; 428/702, 688, 699, 700, 701

[56]             References Cited
           U.S. PATENT DOCUMENTS 3,887,451   6/1975   Cuomo .................................. 204/192
  4,444,615   4/1984   Matsuzawa .......................... 156/603
  4,740,403   4/1988   Oomen .................................... 428/35
  4,770,671   9/1988   Monroe ................................... 51/293
  4,803,392   2/1989   Kushida ................................ 310/311
  5,348,918   9/1994   Budd ...................................... 501/95

OTHER PUBLICATIONS

T. Mah, T. A. Parthasarathy and L. E. Matson, Ceram. Eng. Sci. Proc., 11, pp. 1617–1627, 1990.

Journal of the American Ceramic Society, vol. 76, No. 1, 1993, pp. 29–32–T. Parthasarathy.

D. Viechnicki et al., Journal of Materials Science 4(1969) 84–88, 1969.

*Primary Examiner*—Ellis P. Robinson
*Assistant Examiner*—Leonidas J. Jones, III
*Attorney, Agent, or Firm*—Burgess, Ryan & Wayne

[57]             ABSTRACT

A ceramic composite material consisting of single crystal $\alpha$-$Al_2O_3$ and single crystal $Y_3Al_5O_{12}$ is provided. This composite material has high mechanical strength and creep behavior particularly at high temperatures.

5 Claims, 5 Drawing Sheets

100 μm

100μm

100μm

CERAMIC COMPOSITE MATERIAL

BACKGROUND OF THE INVENTION

1. Field of the Invention

The present invention relates to a ceramic composite material which has a high mechanical strength and an excellent creep resistance in a wide temperature range from room temperature to high temperature and is suitable to be used as a structural material at a high temperature.

2. Description of the Related Art

SiC or $Si_3N_4$ has been investigated to develop ceramic materials to be used at high temperatures but is not sufficient in high temperature properties. As an alternative material thereof, SiC/SiC composite materials produced by chemical vapor impregnation, provided by Societe Europeene de Propulsion, have attracted attention, at the present are considered to be the best high temperature structural materials and have been investigated and developed. The temperature range at which they can be used is reported to be 1400° C. or lower.

Mr. T. Parthasarathy et al. in Journal of the American Ceramics Society Vol. 76, No. 1, pp29–32 (1993) disclosed a composite of alumina and yttrium aluminum garnet (sometime hereinafter referred to as "YAG") of eutectic $Al_2O_3$-$Y_3Al_5O_{12}$. Mr. Parthasarathy et al. also disclose a method of producing the composite by unidirectionally melting and solidifying a mixed powder of $Al_2O_3$ and $Y_2O_3$ in a crucible.

It is comprehensible from the description on page 29, right column, lines 9 to 10 and FIGS. 1 and 2 of the literature that the composite is polycrystalline and includes grain boundaries. This is clearly supported from the description "The failure was usually along the colony boundaries with cracks running along the $Al_2O_3$-YAG interface boundaries". These colony boundaries are shown as portions where the microstructure is larger than in the other portions in FIG. 2 of the literature.

This composite material has stresses equivalent to those of sapphire at 1530° C. and 1650° C. when the strain rate was made constant.

Moreover, the present inventors confirmed in experiments that the composite disclosed by Mr. Parthasarathy et al. includes pores or voids in the microstructure and the mechanical strength of the composite rapidly declares at high temperature.

Therefore, the object of the present invention is to provide a ceramic composite material comprising sapphire, single crystalline $\alpha$-$Al_2O_3$, and YAG, which has excellent mechanical strength and creep behavior from room temperature to high temperature and significantly improved properties particularly at high temperature.

SUMMARY OF THE INVENTION

The above object is attained in accordance with the present invention by providing a composite material consisting essentially of single crystal $\alpha$-$Al_2O_3$ and single crystal $Y_3Al_5O_{12}$.

DESCRIPTION OF THE PREFERRED EMBODIMENTS

The term "single crystal" used in the specification means the crystal structure in which only a diffraction peak from a certain crystal plane of $\alpha$-$Al_2O_3$ or $Y_3Al_5O_{12}$ is observed in an X-ray diffraction of the composite material.

Figure 1:
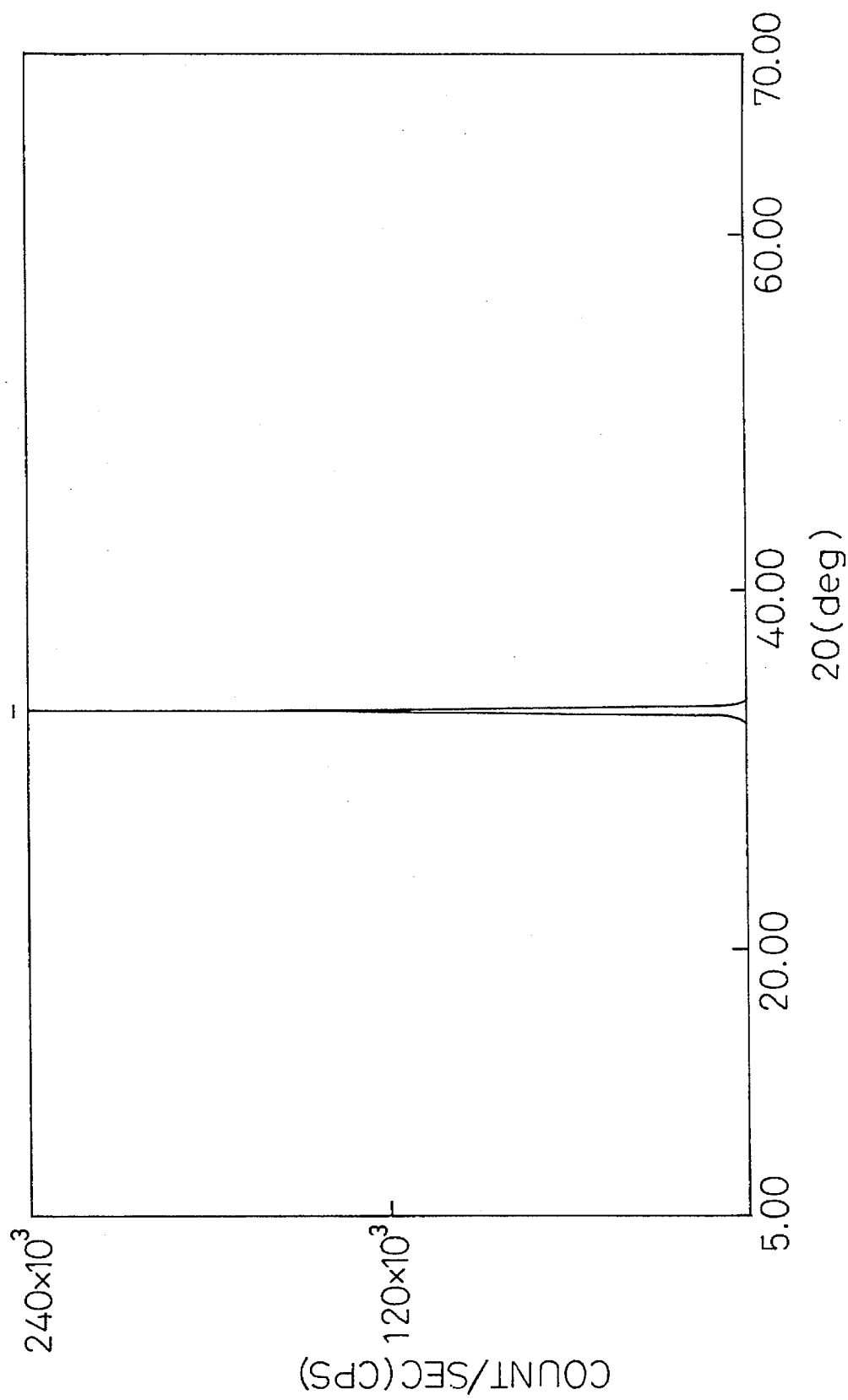
FIGS. 1 and 2 are X-ray diffraction patterns of the composite material obtained in Example 1.
Figure 2:
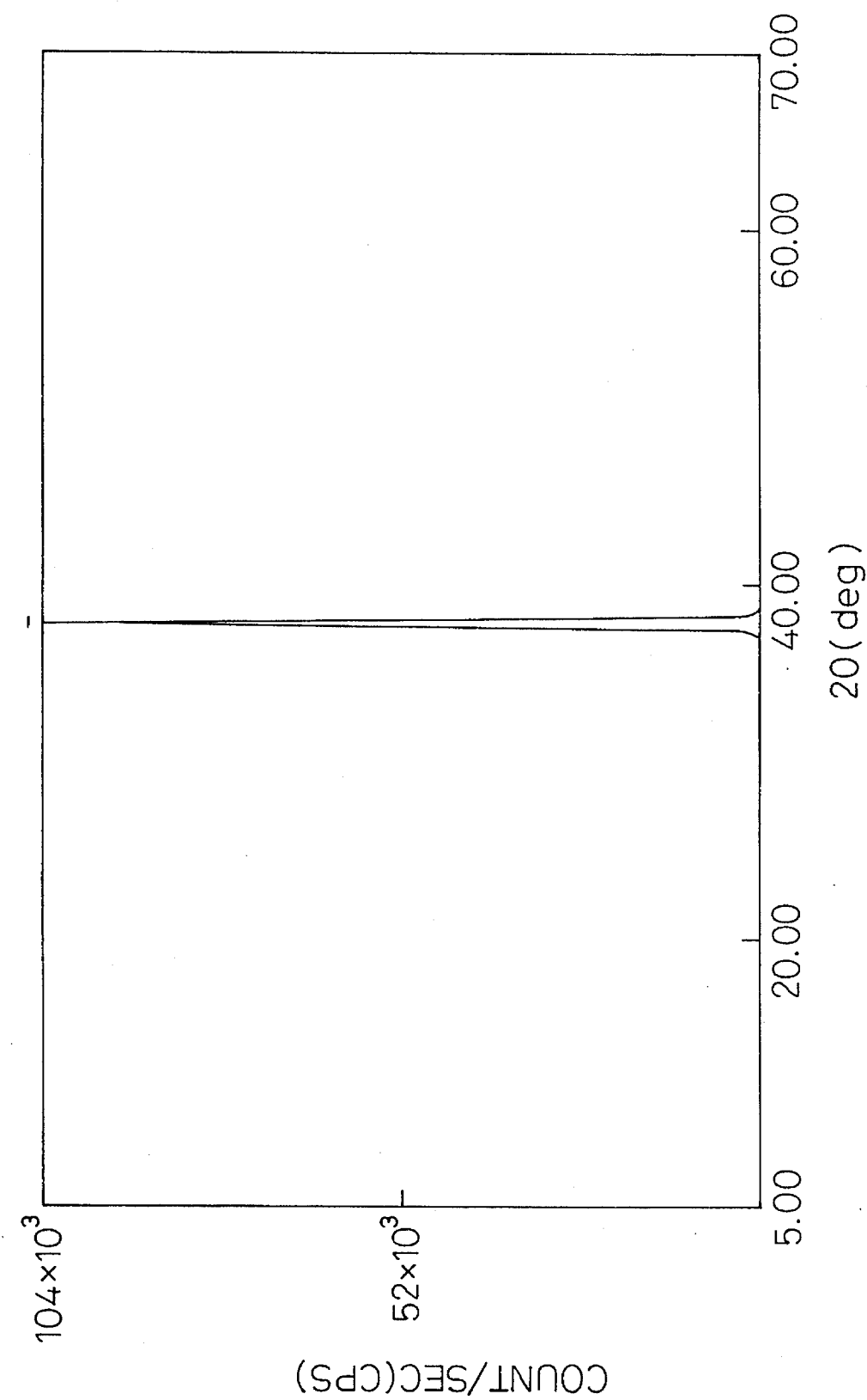

FIG. 1 is an X-ray diffraction pattern from a plane perpendicular to the solidification direction of the ceramic composite material prepared in Example 1, described later, and FIG. 2 is an X-ray diffraction pattern from a plane declined by about 76° from the solidification direction of the same ceramic composite material (no diffraction peak of $Al_2O_3$ was obtainable from an angle perpendicular to the solidification direction).

FIG. 1 shows only a peak at $2\theta=33.26°$ corresponding to diffraction from the (420) plane of YAG. FIG. 2 shows only a peak at $2\theta=37.78°$ corresponding to diffraction from the (110) plane of $Al_2O_3$. These facts clearly indicate that the ceramic composite material of the present invention consists of single crystal $\alpha$-$Al_2O_3$ and single crystal YAG.

Figure 4:
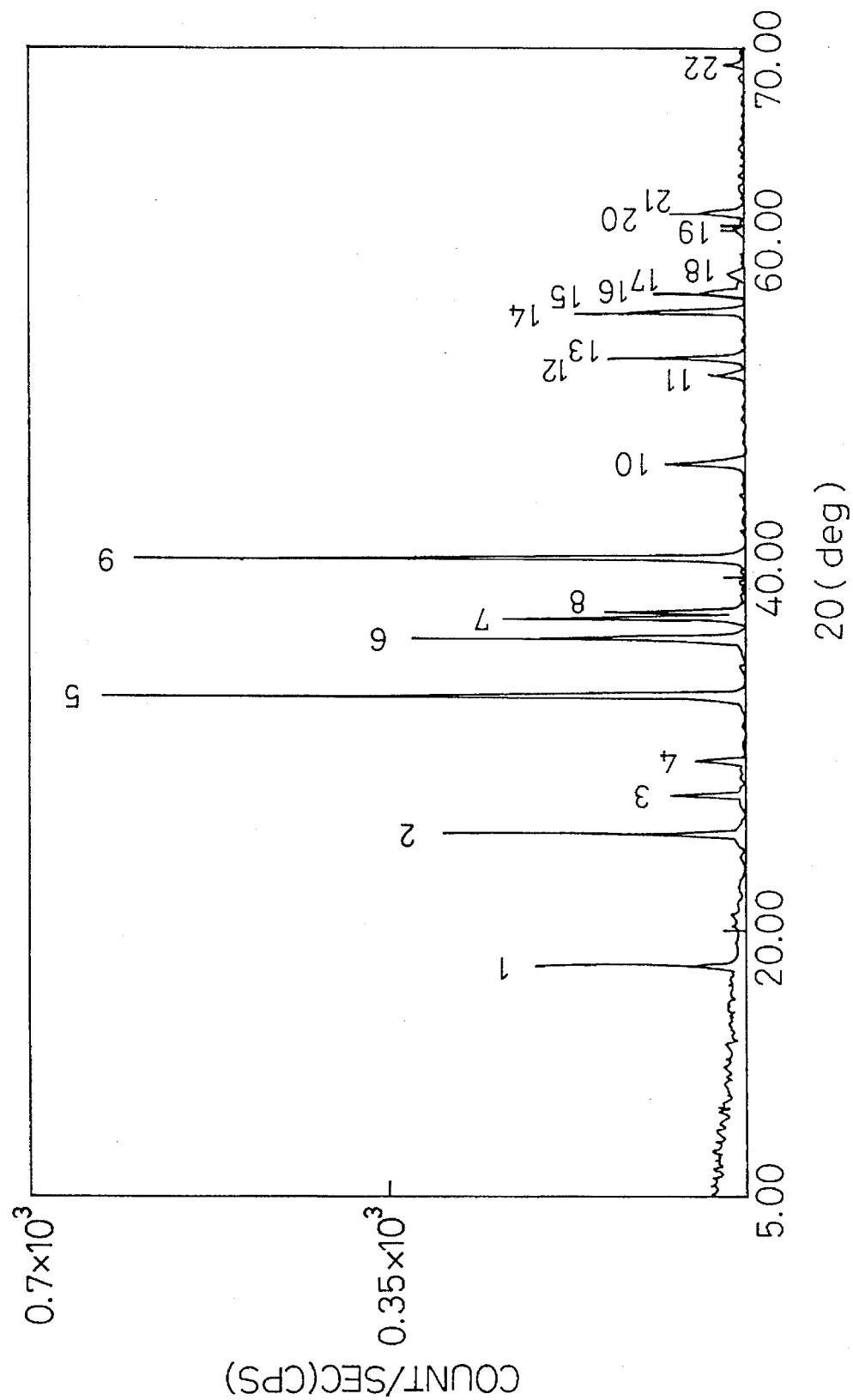
FIG. 4 is an X-ray diffraction pattern of the composite material obtained in Comparative Example 1.

FIG. 4 is an X-ray diffraction pattern from an angle perpendicular to the solidification direction of the ceramic composite material prepared in Comparative Example 1. FIG. 4 shows diffraction peaks from the (110) plane of $Al_2O_3$ and the (420) plane of YAG, as above, as well as the following peaks: for $Al_2O_3$, diffraction peaks at $2\theta=26.62°$, 52.7° and 59.78° corresponding to the (012), (024) and (211) planes respectively and for YAG, diffraction peaks at $2\theta=18.1°$, 27.8°, 29.78°, 36.64°, 38.22°, 41.18°, 46.62° and 60.7° corresponding to the (211), (321), (400), (422), (431), (521) (532) and (651) planes respectively. This X-ray diffraction clearly indicates that the ceramic composite material obtained in Comparative Example 1 was polycrystalline.

Figure 3:
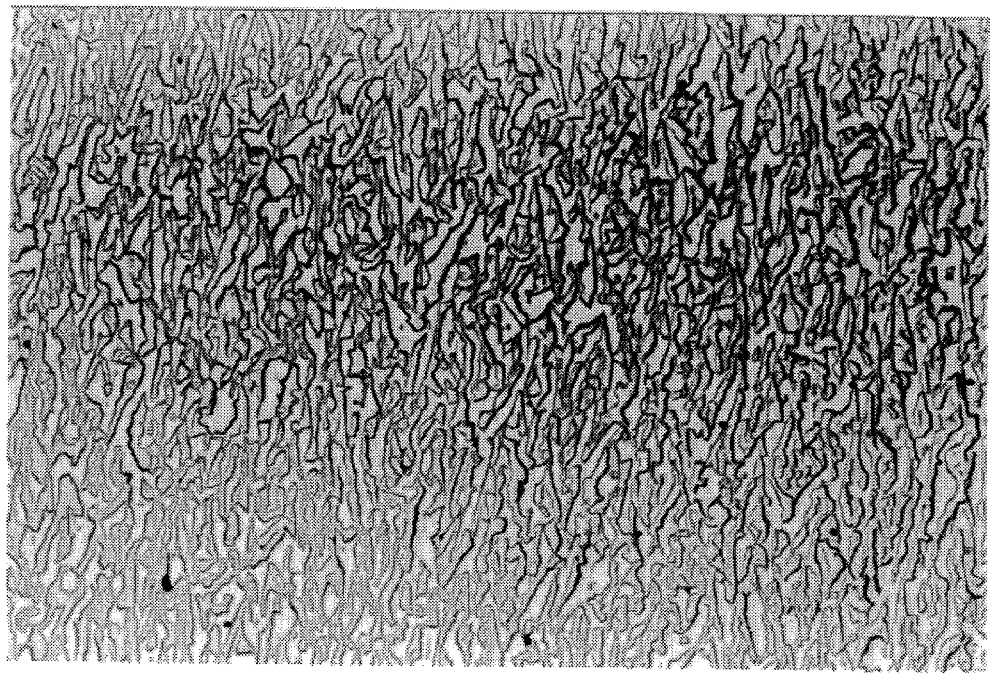
FIG. 3 is a photomicrograph of the composite material of Example 1.

The fact that the ceramic composite material of the present invention consists of single crystal $\alpha$-$Al_2O_3$ and YAG and is obviously different from the composite materials obtained by Mr. Parthasarathy et al. and in Comparative Example 1, is also supported by FIG. 3 showing a photomicrograph of the ceramic composite material obtained in Example 1. In the photomicrograph shown in FIG. 3, no colony, grain boundary or coarse grain is observed, in contrast to FIGS. 1 and 2 of Mr. Parthasarathy et al.'s literature. This photomicrograph corresponds well to the result of the X-ray diffraction indicating that the ceramic composite material consists of single crystal $\alpha$-$Al_2O_3$ and single crystal YAG.

Figure 5:
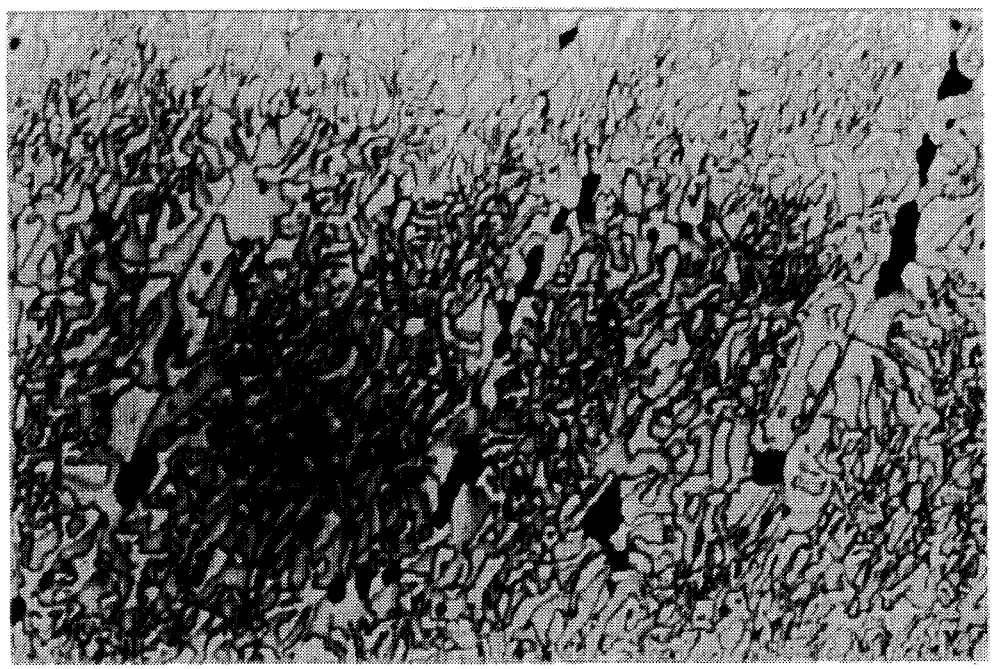
FIG. 5 is a photomicrograph of the composite material of Comparative Example 1.

FIG. 5 is a photomicrograph of the ceramic composite material obtained in Comparative Example 1. FIG. 5 shows that the ceramic composite material includes colonies, grain boundaries or coarse grains, and pores or voids, as shown in Mr. Parthasarathy et al.'s literature.

It is proved from comparison between FIGS. 1 and 2 and FIG. 4 and comparison between FIG. 3 and FIG. 5 that the ceramic composite material of the present invention is a novel composite material consisting of single crystal $\alpha$-$Al_2O_3$ and single crystal YAG, different from the composite material disclosed by Mr. Parthasarathy et al.

In the ceramic composite material of the present invention, the single crystal $\alpha$-$Al_2O_3$ and single crystal YAG form a uniform sea/island structure when a cross-sectional microstructure is observed. It is not certain but is considered that the sea is single crystal $\alpha$-$Al_2O_3$ and the island is single crystal YAG. The sizes of the sea and islands may be varied and controlled by selecting the solidification conditions, but are typically in a range of 10 to 50 μm.

The amounts of single crystal $\alpha$-$Al_2O_3$ and single crystal YAG in the composite material of the present invention can be varied in ranges of about 20 to 80% by volume of single crystal $\alpha$-$Al_2O_3$ and about 80 to 20% by volume of single crystal YAG, by changing the proportion between the $Al_2O_3$ and YAG starting powders. The eutectic composition is 55% by volume of $Al_2O_3$ and 45% by volume of YAG.

The ceramic composite material of the present invention can be produced, for example, by the following process.

A mixed powder of $\alpha$-$Al_2O_3$ and $Y_2O_3$ powders in a ratio for a desired ceramic composite material is prepared by weighing and mixing. The mixing method is not particularly limited and may be either of a dry mixing method or a wet mixing method. In a wet mixing method, alcohol such as methanol and ethanol is generally used as a medium.

The mixed powder is then heated to a temperature at which both starting powders are molten, for example, at 1800° to 2500° C., in a conventional furnace, for example, an arc furnace to melt the mixed powder.

Subsequently, the melt is charged in a crucible and then unidirectionally solidified to prepare a ceramic composite material of the present invention. Alternatively, the melt is once solidified and crushed and the crushed material is then charged in a crucible and melted and unidirectionally solidified.

The atmospheric pressure during the melting and solidification is generally $10^{-3}$ Torr or less, preferably $10^{-4}$ Torr or less. The speed of moving the crucible for unidirectional solidification, i.e., the rate of growth of the ceramic composite material is generally 50 mm/hour or less, preferably 1 to 40 mm/hour. The control of the conditions other than the atmospheric pressure and crucible moving speed can be done in the same manner as in conventional methods.

If the atmospheric pressure or the crucible moving speed during the melting and solidification is outside the above ranges, the material may become polycrystal-line, pores or voids tend to appear at colony boundaries, and it is difficult to obtain a composite material excellent in mechanical strength and creep behavior.

The apparatus for unidirectional solidification may be a conventional one in which a crucible is vertically movably mounted in a vertically arranged cylindrical container, an induction heating coil is disposed around the approximate center position of the cylindrical container, and a vacuum pump is provided to evacuate the container space.

EXAMPLES

Example 1

$\alpha$-$Al_2O_3$ powder (Sumitomo Chemical Co., Ltd., AKP-30) and $Y_2O_3$ powder (Shin-etsu Chemical Co., sub-micron type) in a molar ratio of 82% of the former to 18% of the latter were milled in a wet ball mill using ethanol. The obtained slurry was dried in a rotary evaporator to remove ethanol.

The obtained mixed powder of $\alpha$-$Al_2O_3$ and $Y_2O_3$ was charged in a crucible placed in a chamber, in which the atmospheric pressure was maintained at $10^{-5}$ Torr and the crucible was heated by an induction coil to 1850° to 1900° C. to melt the mixed powder in the crucible. Subsequently, unidirectional solidification was conducted by descending the crucible at a speed of 5 mm/hour under the above atmospheric pressure to obtain a ceramic composite material.

FIGS. 1 and 2 show X-ray diffraction patterns of the composite material obtained from planes perpendicular to and declined by about 76° from the solidification direction of the composite material. Only a diffraction peak from the (420) plane of single crystal YAG is observed in FIG. 1 and only a diffraction peak from the (110) plane of single crystal $\alpha$-$Al_2O_3$ is observed in FIG. 2, which demonstrates that the above composite material consists of single crystal YAG and $\alpha$-$Al_2O_3$.

FIG. 3 is a photomicrograph of the composite material. FIG. 3 demonstrates that the composite material does not include any colony or grain boundary, pores or voids do not exist, and a uniform sea/island structure is formed.

The mechanical strengths of the composite material are shown in Table 1, where the three point bending strength and compressive creep property were measured in air.

Comparative Example 1

The procedures in Example 1 were repeated except that the atmospheric pressure in the chamber was normal pressure to obtain a ceramic composite material. The X-ray diffraction pattern and optical microscopic photograph of the obtained composite material are shown in FIGS. 4 and 5.

FIG. 4 shows diffraction peaks from the (012), (024), (110) and (211) planes of $Al_2O_3$ and diffraction peaks from the (211), (321), (400), (420), (422), (431), (521), (532) and (651) of YAG, indicating that the composite material is a polycrystal. FIG. 5 demonstrates that the composite material includes colony or grain boundary phases and pores.

The mechanical strengths of this composite material are also shown in Table 1. Table 1 also includes the mechanical properties of the sapphire fiber from Journal of the American Ceramic Society Vol. 63, No. 7, pp429–435.

TABLE 1

|  | Example 1 | Comparative Example 1 | Sapphire fiber |
| --- | --- | --- | --- |
| Three point bending strength (MPa) |  |  |  |
| at 1400° C. | 490 | 350 | — |
| at 1500° C. | 490 | 320 | — |
| at 1600° C. | 410 | 250 | — |
| at 1700° C. | 370 | 210 | — |
| Compressive creep strength at 1600° C. (MPa): |  |  |  |
| at Strain rate $1 \times 10^{-4}$ sec$^{-1}$ | 450 | 270 | 280 |
| at Strain rate $1 \times 10^{-5}$ sec$^{-1}$ | 370 | 210 | 220 |

We claim:

1. A ceramic composite material consisting essentially of a single crystal of $\alpha$-$Al_2O_3$ and a single crystal of $Y_3Al_5O_{12}$ and wherein each of said single crystals has a single diffraction peak from a particular crystal plane by X-ray diffraction.

2. A ceramic composite material according to claim 1 wherein said composite material comprises 20 to 80% by volume of the single crystal of $\alpha$-$Al_2O_3$ and 80 to 20% by volume of the single crystal of $Y_3Al_5O_{12}$.

3. A ceramic composite material according to claim 1 wherein said single crystal of α-$Al_2O_3$ and said single crystal of $Y_3Al_5O_{12}$ form a uniform sea/island structure in which sea and islands have a size of 10 to 50 μm.

4. A ceramic composite material according to claim 1 wherein said composite material does not include grain boundaries, pores and voids.

5. A ceramic composite material consisting essentially of a single crystal of α-$Al_2O_3$ and a single crystal of $Y_3Al_5O_{12}$, prepared by a unidirectionally solidifcation process.

* * * * *